July 7, 1959 P. SCHUBERT 2,893,884
CONTINUOUS PRODUCTION OF CELLULOSE SOLUTION
Filed Oct. 27, 1955
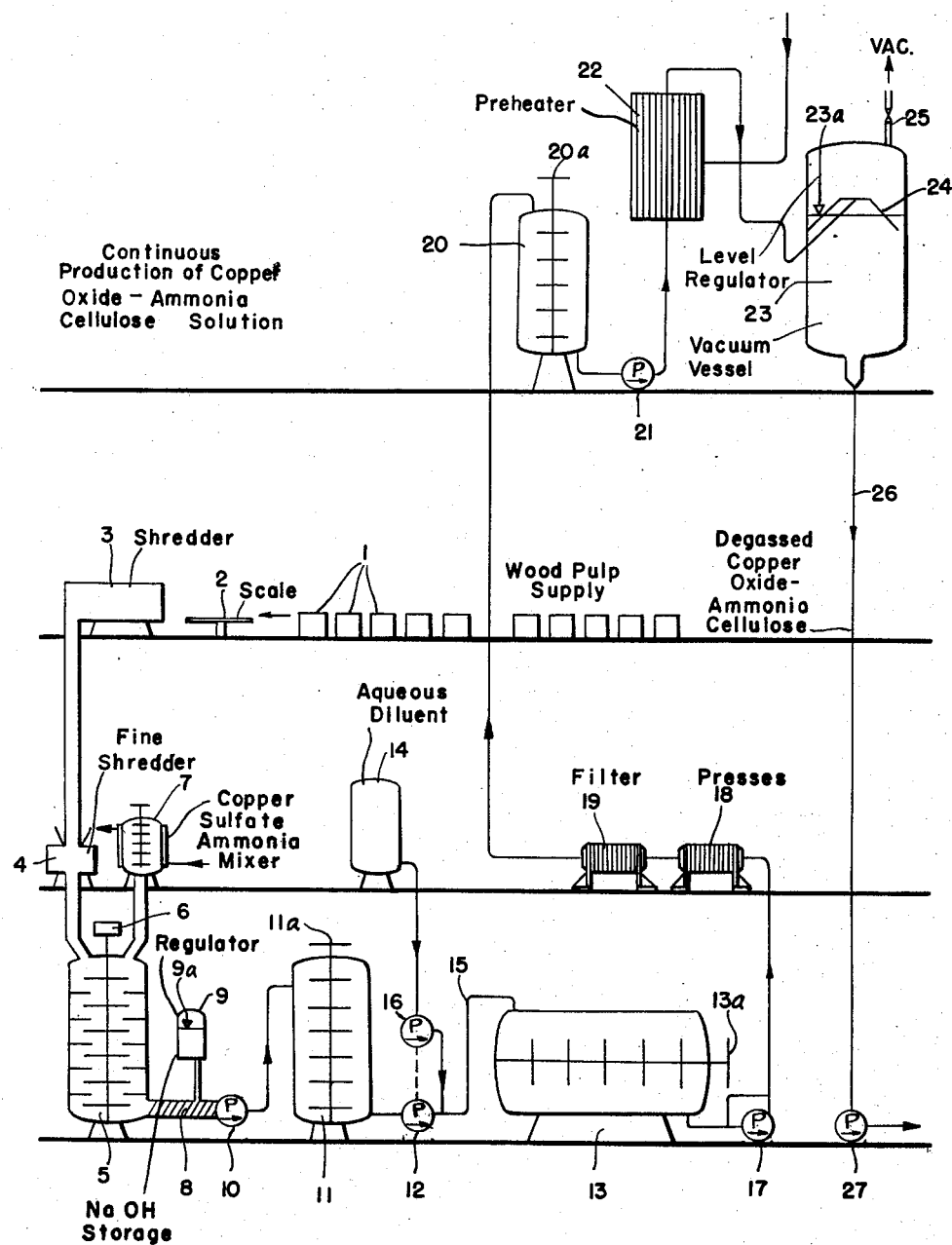
INVENTOR:
PAUL SCHUBERT
BY Marshall, Johnston,
Cook & Root
ATT'YS United States Patent Office 2,893,884
Patented July 7, 1959

2,893,884
CONTINUOUS PRODUCTION OF CELLULOSE SOLUTION

Paul Schubert, Wuppertal-Oberbarmen, Germany, assignor to J. P. Bemberg Aktiengesellschaft, Wuppertal-Oberbarmen, Germany Application October 27, 1955, Serial No. 543,238

Claims priority, application Germany October 30, 1954

4 Claims. (Cl. 106—167)

This invention relates to a continuous process for producing cellulose solution, and in particular, to the continuous production of the copper oxide-ammonia-cellulose solution in the copper oxide-ammonia or cuprammonium process for manufacturing regenerated cellulose. The solution is employed in the production of filaments, films or foils, and articles of other shapes.

Heretofore, the production of the cellulose solution had been discontinuous and batchwise, and the process required a large amount of equipment and was carried out over an extended period of time. The cellulose, e.g., cotton, was first converted into fibers or linters. The cellulose linters were weighed in suitable containers, and the cellulose, basic copper sulfate and ammonia were charged into a mixing kettle where they were mixed together. After stirring for six hours, sodium hydroxide was added, and stirring was continued for an additional six hours. The calculated amount of water or aqueous diluent was added, and the resulting dilute solution was stirred an additional six hours. Meanwhile, a number of analytical tests were made and depending upon the results of the tests, the quantities of the materials were adjusted. After about twenty-four hours, the raw solution was ready, and it was passed through mixing kettles and filters, and finally into vacuum kettles, where the solution was degassed under vacuum. The degassing in this manner required about twelve hours. The solution was subsequently conveyed into the spinning vessels which were operated in a certain predetermined sequence. The complete operation from measuring the ingredients into the first mixing kettle to the availability of the degassed copper oxide-ammonia-cellulose solution for spinning required five to six days. Due to the long period of time required for individual operations and thus also for the complete operation, a large number of kettles, measuring devices and other apparatus was required. Correspondingly, large quantities of materials existed in semi-finished state in the plant.

It had previously been believed that such a slow process was necessary in order to dissolve the cellulose. In the prior process, manufacturers were unwilling to proceed from one step to another without an intervening analysis. The degassing of the solution at rest required that it be kept under vacuum until the last, smallest gas bubbles had risen to the surface of the viscous cellulose solution. The degassing had been improved by removing a portion of the solution in the vacuum kettle, heating and then recycling the heated portion to the vacuum vessel. The heated portion acted to supply heat to the remainder of the solution and facilitate degassing.

An object of the present invention is to provide a new and improved continuous process for producing the copper oxide-ammonia-cellulose solution.

A particular object is to provide a process which is much more rapid than the prior processes, and which requires much smaller quantities of materials in semi-finished condition in the process of production.

A further object is to provide a process wherein intermediate analytical tests between succeeding operations are unnecessary.

An additional object is to provide a process involving a particular sequence of operations for continuously, reliably and rapidly producing the cellulose solution for spinning or other processing.

Another object is to provide in the overall process, a continuous process for converting the cellulose into the initial dilute copper oxide-ammonia-cellulose solution.

A further object is to provide a process for continuously degassing the copper oxide-ammonia-cellulose solution.

These and other objects, advantages and functions of the invention will be apparent on consideration of the specification and of the attached drawing, which is a schematic elevational representation of one embodiment of the process of the invention.

It has now been found in accordance with the invention that by a new sequence of operations, the cellulose solution can be produced continuously, reliably and rapidly, the complete operation from raw cellulose to finished cellulose solution requiring only several hours. It has been found that the cellulose can be dissolved rapidly and completely and that the operations can be carried out without necessity for intermediate analysis to determine the measures to be taken next. Contributing to the success of the process are particular mixing operations which can be carried out with the required degree of exactness, and a much improved degassing method forming a part of the complete process.

The new continuous process involves continuously mixing together basic copper sulfate, ammonia and cellulose, continuously admixing sodium hydroxide with the resulting mixture, continuously diluting the resulting solution, continuously filtering the dilute solution, and continuously degassing the filtered solution. In the process, predetermined measured quantities of the ingredients are added in the proper sequence, and they perform their functions rapidly and completely.

The overall process includes several contributing combinations of steps which themselves constitute significant improvements over the prior procedures. Thus, the initial dilute copper oxide-ammonia-cellulose solution ready for filtration is produced in a continuous process involving the sequence of mixing together basic copper sulfate, ammonia and cellulose, admixing sodium hydroxide with the resulting mixture, and diluting the resulting solution.

Another novel component of the overall process is the much improved degassing process which involves continuously supplying preheated copper oxide-ammonia-cellulose solution in the form of a film, and continuously degassing the solution film.

Referring to the drawing as illustrative of the process, stacks 1 of wood pulp leaves, for example, are weighed on a scale 2 and are then charged to a preliminary shredder 3. The cellulose passes in a continuous stream through the preliminary shredder 3 and then through a fine shredder 4 into the top of or entrance to a baffled mixing vessel or kettle 5, equipped with an agitator 6. The wood pulp leaves are cut into strips about 1 cm. wide in the first shredder 3, and they are finely shredded in the second shredder 4, practically to fibers or fiber balls. When cotton linters are used, being furnished in pressed bales, somewhat different shredders 3 and 4 are employed which tear up the linter bales by scraping, so that the cellulose enters the mixing vessel 5 in a loose, fibrous condition.

Basic copper sulfate is prepared in known manner by precipitating aqueous cupric sulfate with ammonia, and predetermined measured quantities of the basic copper sulfate and ammonia are charged into and mixed in a cooled mixing vessel 7. Predetermined measured quantities of the copper sulfate-ammonia mixture are continuously discharged from the mixing vessel 7 into the top of the mixing vessel 5 at a rate of flow corresponding to the rate of flow of cellulose fibers being discharged from the fine shredder 4. A stream of the solution and a stream of the cellulose are thus brought together simultaneously, and with the correct proportioning thus assured, rapid mutual penetration is obtained. The mixture is homogenized in descending to the bottom of the baffled mixing vessel.

A screw conveyor 8 is located at a discharge outlet adjacent the bottom of the mixing vessel 5, and it continuously conveys the mixture in a stream from the mixing vessel. In the screw conveyor, an intense or strong kneading and further homogenization take place during conveyance of the mixture. Predetermined measured quantities of aqueous sodium hydroxide solution are continuously supplied to the screw conveyor 8 in a stream from a sodium hydroxide storage vessel 9 connected thereto, and the sodium hydroxide is thoroughly mixed with the homogeneous mixture emanating from the mixing vessel 5 and the initial zone of the conveyor 8. The rate of flow of sodium hydroxide may be controlled, for example, by maintaining a constant liquid level or head in the storage vessel 9, by means of a liquid level responsive device or level regulator illustrated schematically at 9a. The liquid head is correlated with the screw turning rate.

The mixture discharged from the screw conveyor 8 is continuously conveyed by means of a pump 10 to another mixing kettle 11, equipped with an agitator 11a, wherein the cellulose solution is substantially completely formed. The cellulose solution is continuously pumped from the solution vessel 11 in a stream by means of a solution pump 12 to one or more mixing vessels 13, equipped with an agitator 13a, which may also serve as reserve storage. During the transfer, aqueous diluent is continuously conveyed in a stream from a storage tank 14 to the transfer line or conduit 15 between the solution pump 12 and the mixing and storage tank 13. The diluent may be water or water containing one or more of the conventional additives, such as tartaric acid, and so forth. The diluent is conveyed from its storage tank 14 by means of a pump 16 which is coupled with the solution pump 12 for proportioning the amount of diluent admixed to the flow rate of the solution in the transfer line 15. Thorough mixing is assured by agitation in the mixing and storage tank 13.

From the foregoing, it will be noted that cellulose and copper sulfate-ammonia mixture are continuously and accurately brought together in measured proportions in the mixing vessel 5. The mixture forms a well mixed stream which is removed from the bottom of the mixing vessel, and it is further intimately mixed in the screw conveyor 8. Sodium hydroxide is there precisely added continuously to the stream from the mixing vessel 5. It is mixed in the screw conveyor or kneader 8, and it is further mixed in the solution vessel 11. The substantially complete solution obtained by the time of removal from the solution vessel 11 is next accurately diluted in a flowing stream in the transfer line 15, after which homogenization is assured by mixing in the mixing and storage vessel 13. In each step of the process, the components are mixed continuously in relatively small successive portions or increments for accurate proportioning and thorough mixing. This is to be contrasted with batchwise mixing or mixing in bulk, which had previously suffered from the disadvantages referred to above.

The initial solution is continuously pumped from the mixing and storage vessel 13 by means of a pump 17 through two filter presses 18 and 19 or other filters connected in series, where the solution is continuously filtered. From the filter presses, the solution flows to an equalization vessel 20 equipped with an agitator 20a, where the maintenance of homogeneity is assured.

The filtered solution is continuously pumped from the equalization vessel 20 by a pump 21 through a pre-heater 22 and into a vacuum vessel 23. A frusto-conical plate or umbrella-like member 24 is mounted in the free space of the vacuum vessel, with its base or lower extremities extending down into the liquid in the vessel. The solution from the pre-heater 22 is continuously discharged on the upper surface of the plate, in the free or gas space in the vessel, and flows over it in a thin film, veil or layer, from whence it flows into the bulk of the liquid in the vessel. At the same time, vacuum is applied to the vessel and its free space through a conduit 25. The preheating supplies heat to the filtered copper oxide-ammonia-cellulose complex solution to gasify the ammonia, the viscosity of the solution is also lowered thereby, and ammonia and dissolved air readily are withdrawn or escape from the solution film and are removed through the vacuum line 25. Due to the provision of the solution in the form of a very thin film on the surface of the plate or generally flat surface 24, there is only a very small thickness of solution to be traversed by the dissolved air, and it reach the surface of the film in but a few seconds. The escaping ammonia further assists in the removal of the air from the solution.

The liquid level in the vacuum vessel 23 is maintained at the desired constant elevation by means of a liquid level responsive device or level regulator illustrated schematically at 23a. The degassed solution is continuously withdrawn from the evacuation or degassing vessel 23 at its base or bottom, where it discharges into a long column or pipe 26. It is continuously pumped from there to the spinning operation, for example, by means of a pump 27. The vacuum vessel discharge or withdrawal column 26 extends vertically for a height sufficient to nullify or counteract the effect of the vacuum in the vacuum vessel 23, so that the degassed solution may be removed.

The degassed solution is then pumped continuously to the distribution manifold of the spinning apparatus. In cooperation therewith, the equalization vessel discharge pump 21 is operated in a rhythm or rate of flow determined by the requirements of the spinning operations, so that continuous flow at the required rate is provided for the spinning operations. It is thus unnecessary to intermittently or periodically charge the finished copper oxide-ammonia-cellulose solution into the spin kettles and discharge it from the spin kettles in the same manner. Also, instead of requiring five to six days for the preparation of the finished solution ready for spinning, the new process produces a satisfactory solution in a few hours. The amounts of materials and solution required in the process of production are only small fractions of those previously necessary.

The following example is given to illustrate the invention, but it is to be understood that the invention is not limited thereto nor to the specific procedures, proportions and conditions therein.

*Example*

In operating commercially to produce 10,000 kg. of rayon per day (equivalent to 9,000 kg. of completely dry cellulose), the following quantities of the ingredients are mixed and processed each 16 minutes as described above and illustrated. 108 kg. of air-dry cellulose containing about 8 kg. of water are weighed on the scale 2 and pass through the shredders or grinders 3 and 4, and into the vessel 5 in the form of fibers. 75 kg. of basic copper sulfate of the formula $$CuSO_4.3Cu(OH)_2.H_2O$$

and 450 kg. of 18.5% aqueous ammonia are mixed in the vessel 7 and supplied to the vessel 5, producing 633 kg. of the resulting mixture.

The pump 10 conveys 633 kg. of the mixture from the vessel 5 to the mixing kettle 11, and 182 kg. of aqueous sodium hydroxide of 90 gm. per liter NaOH concentration flow from the storage vessel 9 into the mixture in the conveyor 8. The pump 12 conveys 815 kg. of the solution from the mixing kettle 11 to the vessel 13. The diluent pump 16 conveys 267 kg. of aqueous diluent containing 2 kg. of tartaric acid into the solution stream in the transfer line 15. The total solution conveyed to the vessel is thus 1082 kg. in a 16 minute period.

This amount of solution is conveyed through the filters 18 and 19 to the equalization vessel 20, through the preheater 22, and onto the plate 24. It is heated to about 35-45° C., preferably about 45° C., in the preheater. The vacuum vessel 23 is evacuated to a pressure of about 35-40 mm. Hg, preferably about 37.5 mm. The resulting degassed solution is conveyed from the vacuum vessel to the spinning operation.

In producing cellulose solution as described, it is not necessary to obtain an intermediate analysis after each stage, as in the prior process, where the result of the analysis determined the measures to be taken next. Instead, it has been found that the operations and proportioning can be correlated in the new process to continuously and reliably produce the solution for spinning. While analysis of the compositions may be made from time to time for verification, corrections are practically unnecessary when steady state operation is reached.

The new process is especially advantageous in reducing the amount of material on hand in semi-finished condition, and the corresponding equipment and space requirements. For example, for 10,000 kg. daily production of rayon, the prior discontinuous process required the presence of 54,000 kg. of cellulose corresponding to about 600,000 kg. of solution in semi-finished form, between shredding and spinning. Employing the new process, only 9,000 kg. of cellulose corresponding to 100,000 kg. of solution is required in semi-finished form.

It will be understood that the description of the operations and claims as "continuous" is intended to include the situations where the several streams of materials are not flowing at equal or corresponding rates but the process nevertheless proceeds in continuous fashion in contradistinction to the batch type of operation. Thus, the several vessels may serve as surge, accumulating or storage tanks, to allow for variations in the flow rates in the system according to operating requirements. It will be further understood that variations from the specific embodiment given by way of illustration will be apparent and can be made within the spirit and scope of the invention.

The invention thus provides a much improved continuous process including new and improved components thereof. The process is accurately, reliably and rapidly carried out. The equipment and labor costs are reduced, space requirements are reduced, and the amount of material in semi-finished condition is much less. The process does not depend on intermediate analysis for proper operation. The invention thus constitutes a marked improvement in the commercial production of regenerated cellulose articles by the cuprammonium process.

The invention is hereby claimed as follows:

1. A continuous process for producing copper oxide-ammonia-cellulose solution which comprises continuously mixing together small successive increments of cellulose and a mixture of basic copper sulfate and ammonia in a mixing zone, continuously conveying the resulting mixture from said mixing zone as it is produced at a rate of flow equivalent to the rate of said mixing, and continuously mixing together small successive increments of sodium hydroxide and said mixture from said mixing zone as said mixture is conveyed therefrom at a rate equivalent to the rate of said conveying.

2. A continuous process for producing copper oxide-ammonia-cellulose solution which comprises continuously mixing together small successive increments of cellulose and a mixture of basic copper sulfate and ammonia in a mixing zone, continuously conveying the resulting mixture from said mixing zone as it is produced at a rate of flow equivalent to the rate of said mixing, continuously mixing together small successive increments of sodium hydroxide and said mixture from said mixing zone as said mixture is conveyed therefrom at a rate equivalent to the rate of said conveying, and continuously mixing together small successive increments of the resulting solution as it is produced and aqueous diluent at a rate equivalent to the rate of said mixing with sodium hydroxide.

3. A continuous process for producing copper oxide-ammonia-cellulose solution which comprises continuously mixing together small successive increments of cellulose and a mixture of basic copper sulfate and ammonia in a mixing zone, continuously conveying the resulting mixture from said mixing zone as it is produced at a rate of flow equivalent to the rate of said mixing, continuously mixing together small successive increments of sodium hydroxide and said mixture from said mixing zone as said mixture is conveyed therefrom at a rate equivalent to the rate of said conveying, continuously mixing together small successive increments of the resulting solution as it is produced and aqueous diluent at a rate equivalent to the rate of said mixing with sodium hydroxide, and continuously filtering the resulting dilute solution as it is produced, supplying the filtered solution as it is produced in the form of a film to an evacuation zone, and degassing the solution film as it is formed, each at a rate of flow equivalent to the rate of said mixing with diluent.

4. A continuous process for producing copper oxide-ammonia-cellulose solution which comprises continuously shredding cellulose, continuously supplying the shredded cellulose as it is produced in small successive increments to a mixing zone, continuously supplying small successive increments of a mixture of basic copper sulfate and ammonia to said mixing zone and mixing them successively with said cellulose increments, continuously conveying the resulting mixture from said mixing zone and kneading the resulting mixture, both as the resulting mixture is produced and at a rate equivalent to the rate of said mixing, and continuously mixing together small successive increments of sodium hydroxide and said resulting mixture as it is conveyed and during said kneading at a rate equivalent to the rate of said conveying.

References Cited in the file of this patent

UNITED STATES PATENTS

| | | |
|---|---|---|
| 1,062,222 | Chaumat | May 20, 1913 |
| 1,457,977 | Kitsee | June 5, 1923 |
| 2,363,247 | Holder | Nov. 2, 1944 |
| 2,687,552 | Gabler | Aug. 31, 1954 |
| 2,714,938 | Smith | Aug. 9, 1955 |
| 2,787,615 | Weigham | Apr. 2, 1957 |

FOREIGN PATENTS

| | | |
|---|---|---|
| 579,171 | Germany | June 23, 1933 |
| 753,651 | Germany | June 29, 1953 |